US009037654B2

(12) United States Patent
Wu

(10) Patent No.: US 9,037,654 B2
(45) Date of Patent: May 19, 2015

(54) METHOD, SYSTEM FOR TRANSMITTING DOCUMENT OVER NETWORK, VIRTUAL PRINTER APPARATUS AND RESTORATION APPARATUS

(75) Inventor: Haijun Wu, Guangdong (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 2071 days.

(21) Appl. No.: 11/793,299

(22) PCT Filed: Dec. 15, 2005

(86) PCT No.: PCT/CN2005/002196
§ 371 (c)(1),
(2), (4) Date: Sep. 23, 2009

(87) PCT Pub. No.: WO2006/063528
PCT Pub. Date: Jun. 22, 2006

(65) Prior Publication Data
US 2010/0005144 A1 Jan. 7, 2010

(30) Foreign Application Priority Data
Dec. 17, 2004 (CN) .......................... 2004 1 0101342

(51) Int. Cl.
G06F 15/16 (2006.01)
G06F 3/12 (2006.01)

(52) U.S. Cl.
CPC .............. *G06F 3/122* (2013.01); *G06F 3/1245* (2013.01); *G06F 3/1285* (2013.01); *G06F 2206/1512* (2013.01)

(58) Field of Classification Search
USPC ........................................ 709/206, 228, 226
See application file for complete search history.

(56) References Cited

U.S. PATENT DOCUMENTS

| 5,241,625 A | * | 8/1993 | Epard et al. .................... 345/502 |
| 5,845,058 A | * | 12/1998 | Shaw et al. ................... 358/1.15 |
| 5,907,835 A | * | 5/1999 | Yokomizo et al. .................... 1/1 |
| 6,040,920 A | * | 3/2000 | Ichiriki ......................... 358/403 |

(Continued)

FOREIGN PATENT DOCUMENTS

| EP | 1083478 A2 | 3/2001 |
| JP | 2003029942 A | 1/2003 |

(Continued)

OTHER PUBLICATIONS

Frank Vahid, "The Softening of Hardware," Computer, vol. 36, No. 4, pp. 27-34, Apr. 2003, doi:10.1109/MC.2003.1193225.*

(Continued)

*Primary Examiner* — June Sison
(74) *Attorney, Agent, or Firm* — Baker & Hostetler LLP

(57) ABSTRACT

The present invention discloses a method system for transmitting a document over a Network including the steps of a document sender converts a sharing document to be transmitted into a GDI (Graph Device Interface) document by performing virtual printing. The document receiver receives the graph device interface document sent from the document sender through the network The document receiver restores the received GDI document. The contents of the restored GDI document are the same as that of the sharing document. The present invention also provides a system, a virtual printer apparatus and a restoration apparatus, the transmission of the document is not restricted by the application using the method, system and apparatus of the present invention.

23 Claims, 7 Drawing Sheets

(56) References Cited

U.S. PATENT DOCUMENTS

| | | | |
|---|---|---|---|
| 6,223,212 B1* | 4/2001 | Batty et al. | 709/204 |
| 6,334,721 B1 | 1/2002 | Horigane | |
| 6,601,087 B1* | 7/2003 | Zhu et al. | 709/205 |
| 6,775,678 B1* | 8/2004 | Hillberg et al. | 1/1 |
| 7,437,483 B1* | 10/2008 | Goossen et al. | 709/247 |
| 7,587,413 B2* | 9/2009 | Nagral et al. | 1/1 |
| RE41,450 E* | 7/2010 | Briggs et al. | 709/224 |
| 8,276,089 B1* | 9/2012 | Jaramillo et al. | 715/769 |
| 2002/0114009 A1 | 8/2002 | Stevens et al. | |
| 2003/0017846 A1* | 1/2003 | Estevez et al. | 455/556 |
| 2003/0093531 A1* | 5/2003 | Yeung et al. | 709/226 |
| 2003/0226114 A1* | 12/2003 | Feldman et al. | 715/523 |
| 2005/0144603 A1* | 6/2005 | Whitten | 717/151 |
| 2006/0156285 A1* | 7/2006 | Jensen et al. | 717/120 |

FOREIGN PATENT DOCUMENTS

| | | |
|---|---|---|
| JP | 2004240775 A | 8/2004 |
| KR | 2001018942 A | 3/2001 |
| KR | 1020010023377 A | 3/2001 |
| KR | 2001044781 A | 6/2001 |
| KR | 20010044781 A | 6/2001 |

OTHER PUBLICATIONS

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

Windows Graphics Programming; authored by Feng Yuan; publish date: Dec. 22, 2000; publisher: Prentice Hall; Chapters 1-3, 5, 6, 16 and 17.*

Supplementary European Search Report for EP Application No. 05818793.1.

* cited by examiner

METHOD, SYSTEM FOR TRANSMITTING DOCUMENT OVER NETWORK, VIRTUAL PRINTER APPARATUS AND RESTORATION APPARATUS

CROSS-REFERENCE TO RELATED APPLICATIONS

This is a national stage of International Application No. PCT/CN2005/002196, filed on Dec. 15, 2006, which claims priority of Chinese Patent Application No. 200410101342.9 filed Dec. 17, 2004, the disclosure of which is hereby incorporated by reference in its entirety.

FIELD OF THE TECHNOLOGY

The present invention relates to network communication technologies, and more particularly, to a method and a system for transmitting a document over a network, a virtual printer apparatus and a restoration apparatus.

BACKGROUND OF THE INVENTION

With the development of the Internet and mobile communication technologies, people may perform such communication as data exchange and message interaction, using a method, e.g., a Local Area Network (LAN), an e-mail and an Instant Messenger (IM) tool. Data exchange includes document transmission, application sharing, and audio and video documents sharing. The document transmission refers to sending, by a document sender, a sharing document to a document receiver using such a method as logging on another computer, using attachment of an e-mail, and using an IM tool. Here, the document refers to a document containing only text and pictures, such as a Word document, an Excel table document, an AutoCAD drawing document and a Photoshop graph document. To view the contents of a sharing document normally, the document receiver must have applications associated with the sharing document installed. In order to reduce the types of the applications to be installed on a document receiver, the above sharing document may also be converted into a document of PDF format. However, in such a case, the PDF document still cannot be read if the document receiver has not had the corresponding application installed.

Usually, people transmit a document using an IM client on a computer or a mobile terminal. A process for transmitting a sharing document with an IM tool, in which an IM user A serves as a document sender and an IM user B serves as a document receiver, is hereinafter described in detail.

FIG. 1 is a flow chart of the conventional method for transmitting a sharing document with an Internet IM tool. As shown in FIG. 1, when both an IM user A and an IM user B use an Internet IM tool, the method for transmitting a sharing document with the IM tool includes the following steps of.

Step 101: the IM user A selects a document to be shared.

In this step, the IM user A selects the document to be shared with the IM user B, such as a text document, a Word document, an AutoCAD document and an Excel document, from the documents stored in a computer to the IM user A.

Steps 102~103: the IM user A requests the IM server for the Internet Protocol (IP) address and port of the IM user B; the IM server returns the IP address of the IM user B to the IM user A.

A unique identifier, such as a user name, a user number, or an e-mail address of the IM user B, is carried in the request for the IP address and the port sent from the IM user A to the IM server. Then, with the unique identifier of the IM user B as the index, the IM server finds out the current IP address and port to the IM user B and returns them to the IM user A.

Step 104: the IM user A tries to connect the IM user B according to the acquired IP address and port.

In this step, the IM user A sends, according to the IP address and port acquired from the IM server, a connection request to the IM user B to try to establish a connection with the IM user B.

Step 105: the IM user A verifies whether the connection to the IM user B succeeds, and performs Step 106 if yes; otherwise, proceeds to Step 107.

In this step, if the IM user A receives a response of the IM user B before a timer of the IM user A expires, the IM user A deems that he has succeeded in connecting with the IM user B; otherwise, the IM user A deems that he cannot connect with the IM user B.

In general, if the IM user B is in a public network or a firewall of the IM user B is weak, the IM user A can connect with the IM user B directly. In other cases, the IM user A cannot connect with the IM user B directly.

Step 106: the IM user A transmits the document to the IM user B and performs Step 109.

Since the IM user A may directly establish the connection with the IM user B, in this step, the IM user A directly sends the document selected in Step 101 to the IM user B.

Steps 107~108: the IM user A sends the document to the IM server and requests the IM server to send the document to the IM user B; then, the IM server sends, based upon the IP address and port of the IM user B, the document coming from the IM user A to the IM user B, and performs Step 109.

Step 109: the IM user B checks and views the received document.

In this step, after receiving the document sent from the IM user A, the IM user B opens the document using software associated with the document and checks and views the contents of the document. Thus, an objective of sharing the same document with the IM user A is achieved. For example, if what the IM user A sent is a Word document, the IM user B opens the Word document using software, such as an Office or a WordPad.

What is described above is a process of transmitting a sharing document between the IM user A and the IM user B using the Internet IM tool. Of course, the sharing document may also be transmitted by using a wireless IM tool used in an intelligent cell phone. The description is hereinafter presented with the example in which the IM user A uses a wireless IM tool while the IM user B uses an Internet IM tool.

FIG. 2 shows a flow chart of a conventional method for transmitting a sharing document with the Internet or an IM tool. As shown in FIG. 2, the method for transmitting a sharing document between an IM user A using a wireless IM tool and an IM user B using an Internet IM tool includes the following steps.

Step 201: an IM user A selects a document to be shared.

In this step, the IM user A selects the document to be shared with the IM user B, such as a text document, a Word document, an AutoCAD document and an Excel document, from the documents stored in the computer to the IM user A.

Step 202: the IM user A sends the document to an IM server through a wireless gateway and requests the IM server to send the document to the IM user B.

In this step, a mobile terminal used by the IM user A routes to the wireless gateway first, and meanwhile, the document and a request for sending the document are sent to the wireless gateway; then, the wireless gateway sends the received document and the request for sending the document to the IM server. A unique identifier of the IM user B is carried in the request for sending the document of the IM user A.

Step 203: the IM server sends the document to the IM user B.

In this step, the IM server searches out, based on the unique identifier of the IM user B, an IP address and port of the IM user B, and sends the document to the IM user B.

Step 204: the IM user B checks and views the received document.

In this step, after receiving the document sent from the IM user A, the IM user B opens the document using software associated with the document, checks and views the contents of the document. Thus, an objective of sharing the same document with the IM user B is achieved. For example, if what the IM user A sent is a Word document, the IM user B opens the Word document using software, such as an Office or a WordPad.

Thus, a process for transmitting a sharing document between the IM user A and the IM user B is completed.

If both the IM user A and the IM user B log on a wireless IM client through an intelligent cell phone, in order that a sharing document is transmitted from the IM user A to the IM user B, the IM server first sends the document to a wireless gateway after Step 202, and the wireless gateway sends the document to the IM user B.

Likewise, in the case that the IM user A uses an Internet IM tool while the IM user B uses a wireless IM tool, in order that a sharing document is transmitted from the IM user A to the IM user B, the IM user A first sends the document to the IM server, and the IM server sends the document to the IM user B through a wireless gateway.

In the above method for transmitting a sharing document with an IM tool, a document receiver must have had the software associated with the document installed in the computer or mobile terminal to the document receiver so as to open a received document and then view and check the contents of the document; the document receiver cannot open and look over the received document if the software associated with the document has not been installed in the computer or the mobile terminal to the document receiver. Moreover, if a version of the software installed in the computer or mobile terminal to the document receiver differs from that of the software with which the document was edited, inconsistency in positions of characters and pictures between the document and original ones may occur, which influences a user reading the sharing document normally.

Likewise, in the case that a sharing document is transmitted using such mode as a LAN or an e-mail, the document receiver must also have had the application associated with the sharing document installed in the computer or mobile terminal, and otherwise, the sharing document can not be read normally.

SUMMARY OF THE INVENTION

In view of the above, objective of the present invention is to provide a method, a system for transmitting a document over a Network, a virtual printer apparatus and a restoration apparatus so as to enable a document receiver to view contents of a document in the case that the document receiver has not had software associated with the sharing document installed.

The embodiments of the present invention provides a method for transmitting a document over a Network, and the method includes the steps of:

converting, a sharing document to be transmitted into a GDI (Graph Device Interface) document by performing virtual printing;

receiving, by a document receiver the GDI document sent from a document sender through a network;

restoring, by the document receiver, the received GDI document, wherein contents of the restored GDI document are same as that of the sharing document.

The present invention also provides a system for transmitting a document over a Network, comprising: a document sender and a document receiver; and further comprising: a virtual printer module and a restoration module.

The document sender is used for outputting a sharing document to be sent to the virtual printer module, receiving a GDI document into which the sharing document is converted from the virtual printer module and sending the GDI document to the document receiver.

The virtual printer module is used for receiving a sharing document from the document sender, performing virtual printing to convert the sharing document into the GDI document, and outputting the GDI document to the document sender.

The restoration module is used for receiving a GDI document from the document receiver, restoring the same GDI document, wherein contents of the restored GDI document are same as that of the sharing document from the GDI document, and outputting the contents to the document receiver.

The document receiver is used for receiving a GDI document from the document sender, outputting the GDI document to the restoration module, and receiving the same contents as the sharing document sent from the restoration module.

The embodiments of the present invention also provide a virtual printer apparatus, comprising: a document sender; and further comprising: a virtual printer module; the document sender is used for outputting a sharing document to be sent to the virtual printer module, receiving the GDI document into which the sharing document is converted from the virtual printer module and sending the GDI document to a document receiver; the virtual printer module is used for receiving a sharing document from the document sender, performing virtual printing to convert the sharing document into a GDI document, and outputting the GDI document to the document sender.

The embodiments of the present invention also provide a restoration apparatus, comprising: a document receiver, and further comprising: a restoration module; the restoration module is used for receiving a GDI document from the document receiver, restoring GDI document, wherein contents of the restored GDI document are same as that of the sharing document, and outputting the restored GDI document to the document receiver; the document receiver is used for receiving a GDI document from a document sender, outputting the GDI document to the restoration module, and receiving the restored GDI document which has the same contents as the sharing document sent from the restoration module.

The embodiments of the present invention also provide a method for sending a document over a Network, comprising the steps of: converting, by a document sender, a sharing document to be transmitted into a GDI (Graph Device Interface) document by performing virtual printing; sending, by the document sender, the GDI document to a document receiver through a network.

The embodiments of the present invention also provide a method for receiving a document over a Network, comprising the steps of receiving, by a document receiver, a GDI document sent from a document sender through a network, wherein the GDI document is converted from a sharing document; restoring, by the document receiver, the received GDI document, wherein contents of the restored GDI document are same as that of the sharing document.

With the present invention, the receiver of the sharing document may view the contents of the sharing document all the same in the case that the receiver has not had the software associated with the document installed. Specifically, the present invention has the following benefits:

1. since all operating systems with a graph operating interface include a graph device interface (GDI) subsystem and the subsystem provides multiple GDI functions for being called by the applications in the operating system, in the present invention, the GDI document converted from a sharing document is transmitted and the document receiver may restore the contents of the sharing document only by performing the GDI instructions in the GDI document orderly with the existing GDI subsystem, that is, the document receiver may succeed in viewing the sharing document without the need of having any associated application installed, which reduces the difficulty for the document receiver in reading the contents of the sharing document;

2. since GDI functions have the strong function of supporting vector data and non-vector data at the same time, the converted GDI document is the same as the sharing document in aspects, such as color and lines, that is, the consistency between the GDI document and the sharing document is better.

DETAILED DESCRIPTION OF THE INVENTION

In order to make the objectives and technical solution of the present invention clearer, a detailed description of the present invention is hereinafter given with reference to the drawings and embodiments.

Figure 1:
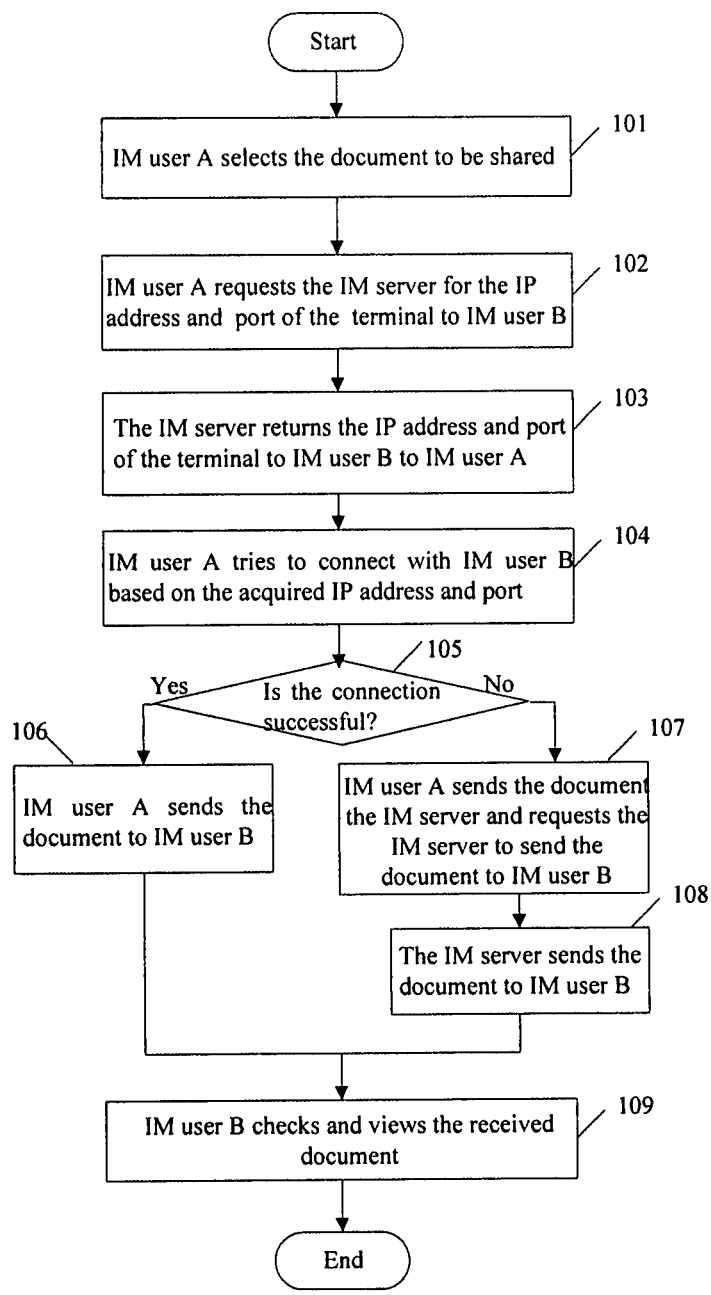
FIG. 1 shows a flow chart of a conventional method for transmitting a sharing document with an Internet IM tool.
Figure 2:
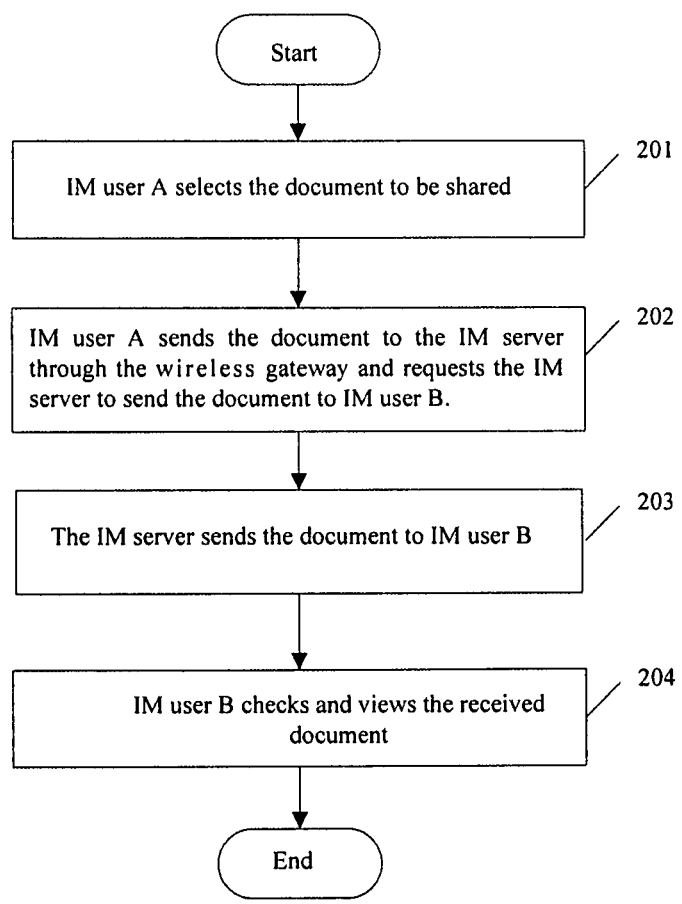
FIG. 2 shows a flow chart of a conventional method for sharing a document with the Internet or an IM tool.
Figure 3:
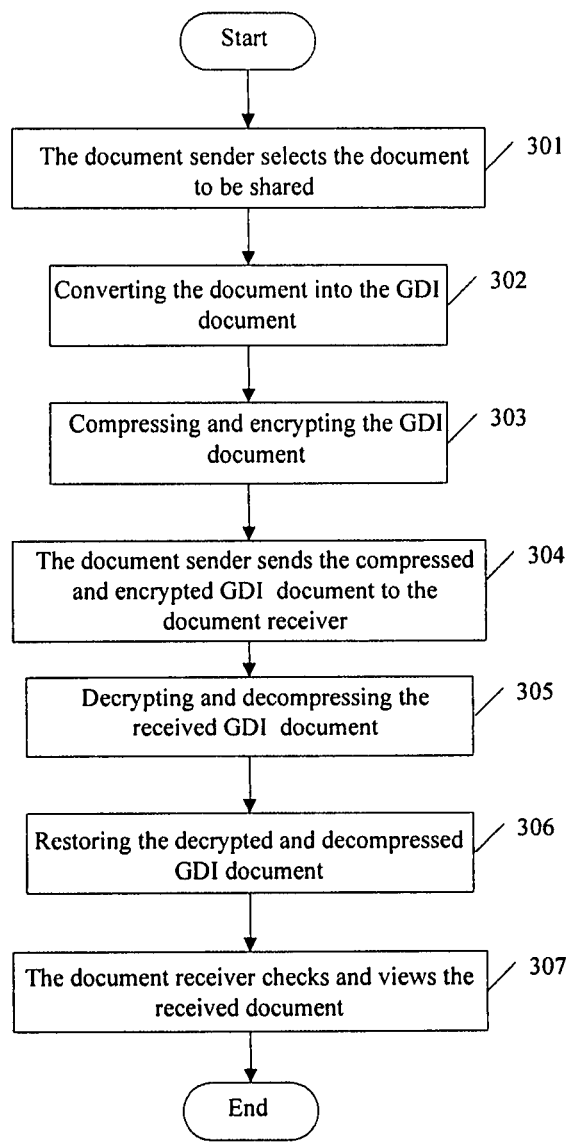
FIG. 3 shows a flow chart of a preferred embodiment according to the present invention.

FIG. 3 shows a flow chart of a preferred embodiment according to the present invention. As shown in FIG. 3, the method includes the following steps.

Step 301: a document sender selects a document to be shared.

In this step, the document sender selects the document to be shared with a document receiver, such as a text document, a Word document, an AutoCAD document and an Excel document, from the documents stored in a computer or mobile terminal to the document sender.

Step 302: the document sender converts the sharing document into a GDI document by executing virtual printing.

A GDI is a subsystem of an operating system with graphic interface and used for implementing output of a specific hardware. Specifically, the GDI accepts a graphing request sent by such an application as the Office and the AutoCAD, through calling a GDI function, and sends the GDI function to a corresponding device driver so as to execute the output of the specific hardware, such as a printer and a screen.

In the present invention, a virtual printer module is established in a terminal of the network to the document sender and used for cooperating with the application to perform the virtual printing of a sharing document. The virtual printing refers to sending, by an application, GDI functions corresponding to the sharing document to a virtual printer module according to contents of the sharing document, and the virtual printer module receives the GDI functions sent from the application of the sharing document, converts each of the GDI functions into a GDI instruction, and a GDI document is formed by synthesizing GDI instruction flow composed of all the GDI instructions.

Step 303: an IM client to the document sender compresses and encrypts the GDI document.

In this step, an IM client to the document sender first compresses the document generated by the virtual printer module with such a dictionary compression algorithm as the LZ77 and the LZW, to make space occupied by the document smaller, which is favorable for transmission over a Network; and then, encrypts the compressed GDI document with such a conventional algorithm which is designated with the document receiver in advance as a symmetrical encryption algorithm and an asymmetrical encryption algorithm, to improve security of the sharing document.

In addition, in this step, the IM client to the document sender may also first encrypt the GDI document generated by the virtual printer module and then compress the encrypted GDI document.

Step 304: the document sender sends the compressed and encrypted GDI document to the document receiver.

In this step, when transmitting the sharing document using an IM tool, the document sender sends the compressed and encrypted GDI document to the document receiver based on Steps 102 to 108 or Steps 202 to 203 described in the background of the invention. In the case that the document sender is transmitted in a LAN, the document sender logs on a computer to the document receiver and copies the compressed and encrypted GDI document into a document folder in the computer. In the case that the document sender is transmitted through an e-mail, the document sender sends the compressed and encrypted GDI document as an attachment to the document receiver.

Step 305: an IM client to the document receiver decompresses and decrypts the received GDI document.

If the compression is first performed and then the encryption is performed in Step 303, in this step, the IM client to the document receiver first decrypts the GDI document sent from the document sender based on the encryption and decryption algorithm designated in advance, and then, decompresses the decrypted GDI document.

If the encryption is first performed and then the compression is performed in Step 303, in this step, the IM client to the document receiver first decompresses the GDI document sent from the document sender, and then, decrypts the decompressed GDI document based on the encryption and decryption algorithm designated in advance.

Step 306: the IM client to the document receiver restores the decrypted and decompressed GDI document as to make the contents of the GDI document consistent with the sharing document. Here, the restoration operation corresponds to the conversion operation in Step 302, i.e. the restoration operation is the counter process of the conversion operation, it also can be called the decode operation of the GDI document.

In this step, the IM client, computer in the LAN, or e-mail client to the document receiver extracts a GDI instruction flow from the GDI document, finds the corresponding GDI function based on the number of GDI function contained in each of the GDI instructions, and performs each GDI function orderly to restore the GDI document into such representing forms as characters and pictures, which are the same as those of the sharing document in the document sender.

Step 307: the document receiver checks and views the received document.

In this step, the document receiver directly opens the restored GDI document, checks and views the GDI document. Thus, the objective of sharing the same document with the document sender is attained without assistance of any application.

What is described above is the general method for transmitting a sharing document over a network of the present invention and the key steps of the method are hereinafter described in detail.

Figure 4:
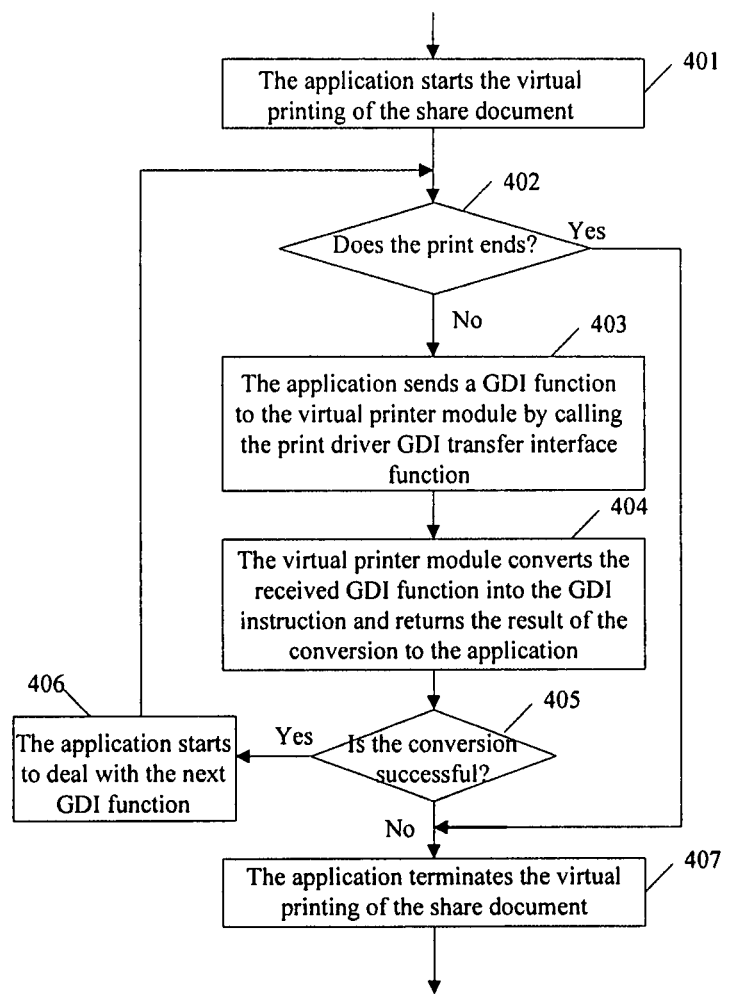
FIG. 4 shows a flow chart of the method for generating a GDI document according to embodiment of FIG. 3.

FIG. 4 is a flow chart of method for generating a GDI document according to the embodiment described in FIG. 3. As shown in FIG. 4, the method for converting the sharing document into the GDI document in Step 302 includes the following steps.

Step 401: the application starts executing the virtual printing of the sharing document.

In this step, first, the document sender opens the sharing document with the application associated with the sharing document, and then, the application starts the virtual printing of the sharing document by opening the interface for interacting with the virtual printer module.

Step 402: the application determines whether the virtual printing should be terminated, and performs Step 407 if yes; otherwise, performs Step 403.

In this step, the application determines, based on determining whether its GDI functions have all been sent to the virtual printer module, whether the print should be terminated, and specifically, the application deems that the virtual printing should be terminated if the GDI functions have all been sent to the virtual printer module, and the application deems that the virtual printing should not be terminated if all of the GDI functions have not been sent.

Step 403: the application sends a GDI function to the virtual printer module by calling a print driver GDI transfer interface function.

For the application, a document with rich pictures and characters is the display result obtained by calling a series of GDI functions performed orderly by the GDI subsystem. The virtual printing process of a document is the same as that for the application displaying the document, that is, the virtual printing output of the document is also implemented by performing a series of GDI functions. There are two special GDI functions in the virtual printing process: a StartDoc function and an EndDoc function. The function of the StartDoc function is that the application notifies the print driver to start the print of a new document while the function of the EndDoc function is to notify the print driver to terminate the print of a document. In this step, the application sends the leading one of the GDI functions that have not been sent out to the virtual printer module. The GDI function includes the name of the GDI function and the detailed information, such as a number of the parameters of the function and detailed value of each of the parameters.

Step 404: the virtual printer module converts the received GDI function into the GDI instruction and returns the result of the conversion to the application.

In the present invention, a GDI instruction includes the following portions at least:

1. number of GDI function: occupying 4 bytes, each of the GDI functions having a number of GDI function corresponding to its name uniquely;

2. serial number of the GDI performance: occupying 4 bytes and indicating the implementing order of the GDI function for the sharing document, the smaller the serial number of the GDI performance being, the earlier the function being performed;

The GDI instruction further comprises:

3. total length of the GDI instruction: occupying 4 bytes and indicating the total length of each portion in the GDI instruction;

4. number of the parameters: occupying 1 byte and indicating a number of the parameters contained in the GDI function.

Moreover, if the GDI function contains n parameters, the GDI instruction also includes the lengths of the first parameter, the second parameter, . . . , and the $n^{th}$ parameter, each of which occupies 4 bytes, and value of each parameter.

For example, for the GDI function, _LineTo(int x, int y), a number of GDI that the GDI function corresponding to is 54, value of the first parameter of the GDI function, x, is 199, and value of the second parameter is 218. According to the above description of GDI function, the GDI function is converted into the format shown in Table 1.

TABLE 1

| | |
|---|---|
| Number of GDI | 54 |
| the serial number of the GDI performance | 5 |
| Total length of the GDI instruction: | 29 |
| Number of the parameters: | 2 |
| Length of the first parameter | 4 |
| Value of the first parameter | 199 |
| Length of the second parameter | 4 |
| Value of the second parameter | 218 |

In this step, the virtual printer module converts the received GDI function based on the format of GDI instruction shown in Table 1, and returns the implementing result of GDI function indicating whether the conversion is successful to the application. The detailed process of this step will be hereinafter described in detail.

Steps 405~407: the application determines, based on the implementing result of GDI function returned by the virtual printer module, whether the conversion is successful, and if yes, starts to deal with the next GDI function and returns back to Step 402; otherwise, the application terminates the virtual printing of the sharing document by sending the EndDoc function to the virtual printer module, and the virtual printer module terminates the procedure for generating the GDI document after receiving the EndDoc function.

The application keeps on sending a next GDI function to the virtual printer module if the virtual printer module has returned an implementing result indicating that the GDI function has been performed successfully; otherwise, that is, if the application has received an implementing result indicating a failure in performing the GDI function, the application stops sending a GDI function to the virtual printer module and terminates the virtual printing of the sharing document by sending an EndDoc function.

Thus, the sharing document is converted into the GDI document by performing the virtual printing.

Figure 5:
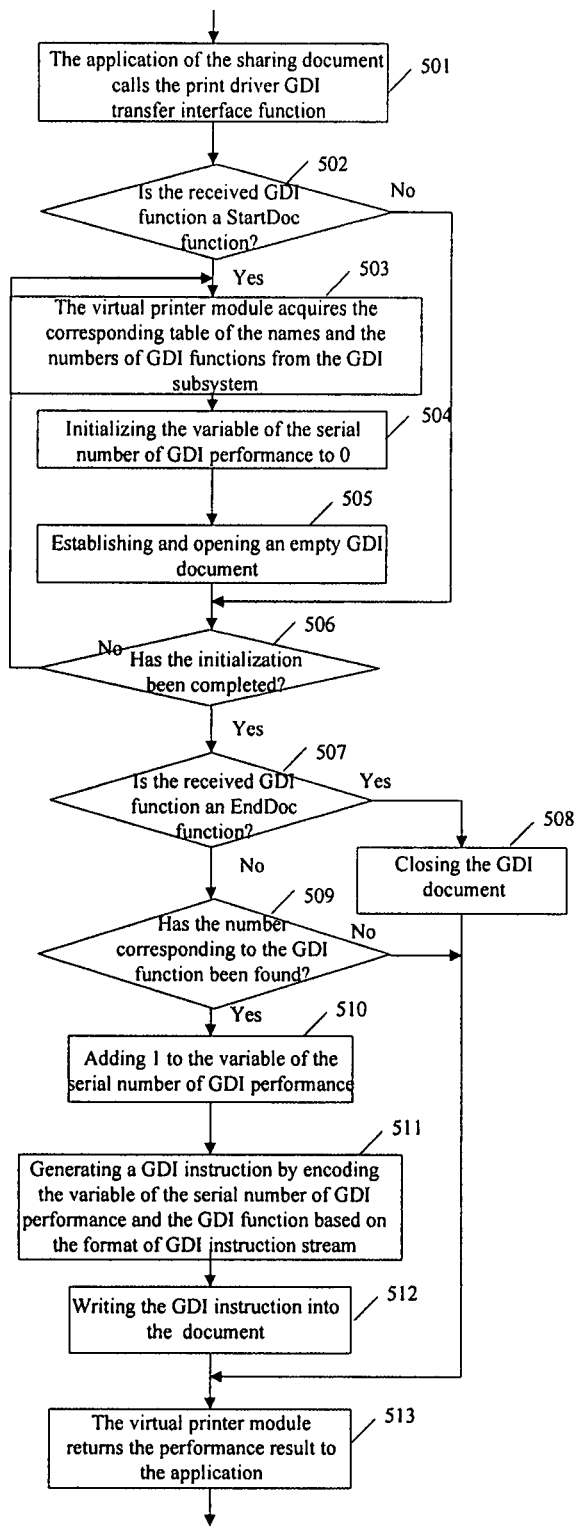
FIG. 5 shows a flow chart of the method for generating a GDI instruction stream according to embodiment of FIG. 4.

The process for converting a GDI function into the GDI instruction in Step 404 is hereinafter described in detail. FIG. 5 shows the flow chart of the method for generating a GDI instruction stream according to embodiment of FIG. 4. As shown in FIG. 5, the virtual printing converts a received GDI function into the GDI instruction and returns the result of the conversion as the implementing result of the GDI function to the application. The method includes the following steps:

Step 501: the print driver GDI transfer interface function is called by the application.

Since the application calls the printer driver GDI transfer interface function, in this step, the interface function starts to be performed in the virtual printer module so as to start to convert the GDI function sent from the application.

Step 502: the virtual printer module determines whether the received GDI function is the StartDoc function indicating start of virtual printing, and performs Step 503 if yes; otherwise, performs Step 506.

Since the function of the StartDoc function is to notify the virtual printer module to start to print a new document, that is, the StartDoc function is the first GDI function that is sent to the virtual printer module by the application when the application performs the transfer for printing, the objective of the determination performed in this step is to determine whether the conversion of the sharing document into the GDI document is to be started, and thus, the subsequent steps may be determined.

Steps 503~505: the virtual printer module acquires the corresponding table of the names and the numbers of GDI functions from the GDI subsystem, initializes the variable of the serial number of the GDI performance to 0, and establishes and opens an empty GDI document.

What has been performed above is the initialization operation in the process for converting the sharing document into the GDI document.

For a GDI subsystem, the GDI subsystem contains a corresponding table in which each of the names of GDI functions corresponds to a number of GDI function uniquely. The name of GDI function is valid only when the corresponding number of GDI function can be found in the corresponding table, and likewise, the number of GDI function is valid only when the corresponding name of GDI function can be found. Thus, the corresponding table is acquired to determine whether a name of GDI function sent from the application is valid in the subsequent procedure.

Since the application sends the corresponding GDI functions based on the contents of the sharing document, a variable of the serial number of GDI performance is set here so as to the document receiver which receives the sharing document knows definitely the performing order of each of the GDI instructions. Thus, the contents of the sharing document may be reproduced. In the case that the received name of GDI function is valid, the current variable of the serial number of GDI performance is written, as the serial number of GDI performance, into the GDI instruction to indicate the performing order of the GDI instruction in all the GDI instructions contained in the sharing document. The GDI instruction with a smaller variable of the serial number of GDI performance is performed earlier.

After acquiring the corresponding table and initializing the variable of the serial number of GDI performance, the virtual printer module establishes and opens an empty GDI document by calling a function for opening a document, such as the Open File function, and thus, the virtual printer module may write the converted GDI instruction flow into the GDI document.

Thus, the virtual printer module completes the initialization and generates a initialization variable indicating that the initialization has be completed, for example, in the case that the initialization variable equals 1, it is indicated that the initialization has been completed.

Step 506: the virtual printer module determines whether the initialization has been completed and performs Step 507 if yes; otherwise, cycles back to Step 503;

In this step, the virtual printer module determines the steps to be performed subsequently by determining whether the value of the initialization variable indicates that the initialization has been completed.

Step 507~508: the virtual printer module determines whether the received GDI function is the EndDoc function indicating termination of virtual printing, and closes the GDI document and performs Step 513 if yes; otherwise, performs Step 509.

Since the EndDoc function is a function that is used by the GDI subsystem to notify the virtual printer module to terminate the virtual printing of a document, the virtual printer module stops converting a GDI function into the GDI instruction and closes the GDI document by calling the Close File function.

Steps 509~510: the virtual printer module determines whether the number of GDI function corresponding to the current GDI function has been found, and adds 1 to the variable of the serial number of GDI performance; otherwise, performs Step 513.

If there is a number of GDI function corresponding to the name of GDI function received currently from the application, the name of GDI function is valid, that is, a portion of the contents of the sharing document may be restored by performing the GDI function corresponding to the name of GDI function. In the case that the current name of GDI function is valid, the virtual printer module adds 1 to the variable of the serial number of GDI performance. Since in the present invention, the serial number of GDI performance with the value of 1 indicates the first GDI instruction to be performed, 1 is added to the value of the variable of the serial number of GDI performance in this step. Of course, if the serial number of GDI performance with the value of 0 indicates the first GDI instruction to be performed, 1 needs not to be added to the variable of the serial number of GDI performance in this step while 1 should be added after the GDI function is converted into the GDI instruction.

Step 511~512: the virtual printer module generates a GDI instruction by encoding the variable of the serial number of GDI performance and the GDI function based on the format of GDI instruction stream, and writes the GDI instruction into the GDI document.

In this step, the virtual printer module writes the contents of the current GDI function into the corresponding parts of the table based on the format of GDI instruction shown in Table 1. The variable of the serial number of GDI performance is used as the serial number of GDI performance in Table 1, the number corresponding to the name of current GDI function found in Step 509 is used as the number of GDI function, and all the other parts are contained in the GDI function received from the application. Thus, a GDI function is converted into the GDI instruction.

Next, the virtual printer module writes the acquired GDI instruction into the GDI document established and opened in Step 505.

Step 513: the virtual printer module returns the implementing result to the application.

In this step, the virtual printer module takes the implementing result, which indicates whether the conversion of the current GDI function to the GDI instruction is successful, as the implementing result of the GDI function and returns it to the application, and thus, the application may decide to keep on sending a GDI function or not.

If this step is performed after Step 508, a implementing result indicating that the GDI document has been generated is returned to the application; If this step is performed after Step 509, a implementing result indicating a failure in converting GDI function is returned to the application; If this step is performed after Step 512, a implementing result indicating that a GDI function is converted successfully is returned to the application;

Thus, the virtual printer module converts a GDI function into a GDI instruction by performing the printer driver GDI transfer interface function.

Figure 6:
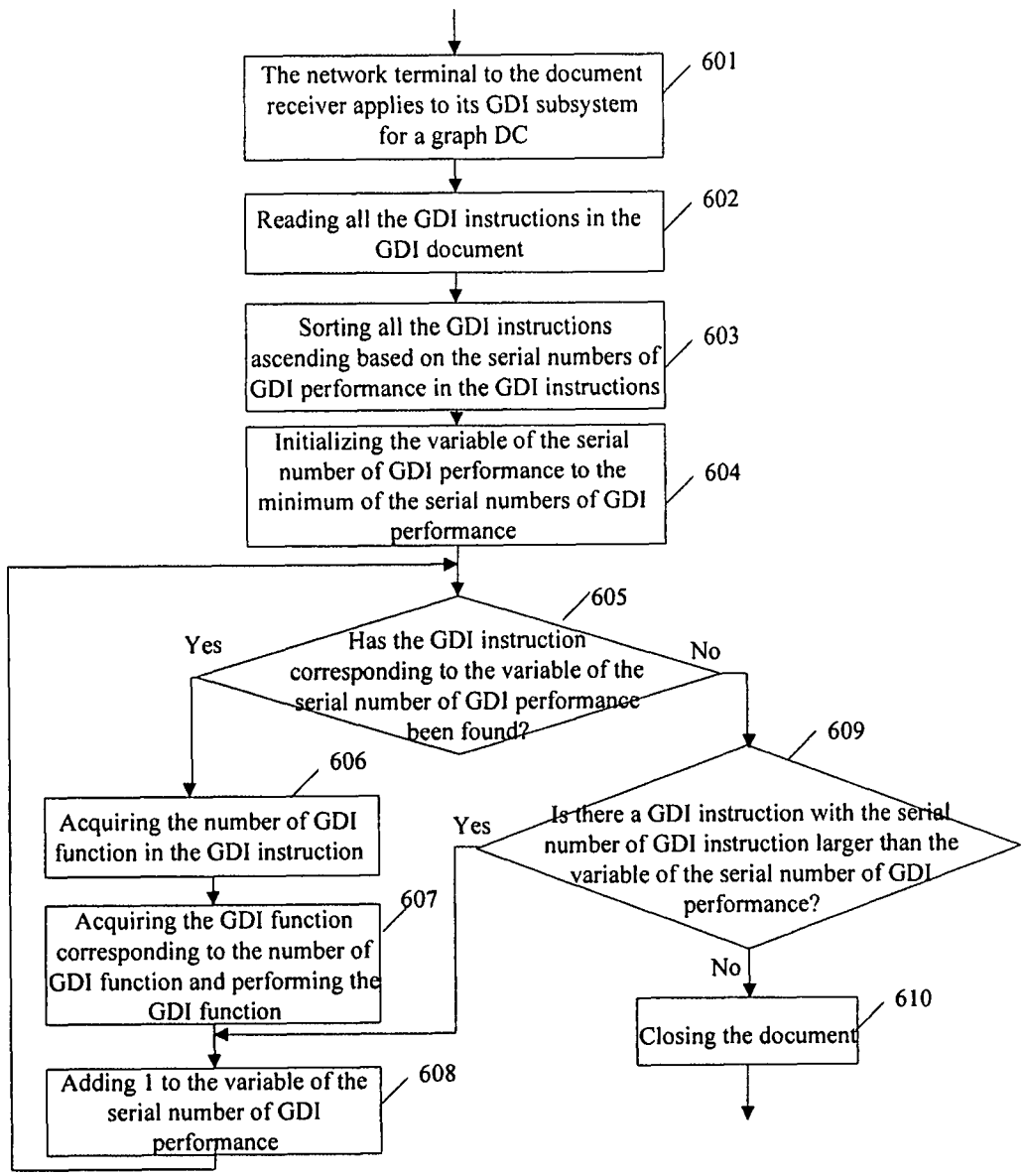
FIG. 6 shows a flow chart of the operation of restoring a received GDI document according to embodiment of FIG. 3.

The same contents as those of the sharing document may be displayed only after restoring the GDI document composed of the GDI instructions. FIG. 6 is a flow chart of method for restoring the received GDI document according to embodiment of FIG. 3. As shown in FIG. 6, the method for restoring a GDI document in Step 306 includes the following steps:

Step 601: the network terminal to the document receiver applies to its GDI subsystem for a graph Device Context (DC).

A graph DC, which is a graph handle allocated by the GDI subsystem, provides a virtual space for restoring the GDI document, and thus, each of the GDI instructions in the GDI document may be performed orderly in the graph DC.

Step 602~603: the network terminal to the document receiver reads all the GDI instructions in the GDI document and sorts all the GDI instructions ascending based on the serial number of GDI performance in the GDI instructions.

The network terminal to the document receiver first reads all the GDI instructions from the GDI document, then extracts the serial number of GDI performance from the GDI instructions, and sorts the corresponding GDI instructions in the order of the values of the serial number of GDI performance being from small to large. Thus, each of the GDI instructions may be performed in the sorted order in the subsequent steps to restore the contents of the sharing document.

Step 604: the network terminal to the document receiver initializes the variable of the serial number of GDI performance to the minimum of the serial numbers of GDI performance.

For the IM client, computer in the LAN or e-mail client to the document receiver, the variable of the serial number of GDI performance is the index to perform a GDI instruction, and specifically, the serial number of GDI performance in the GDI instruction being performed is the same as the current value of the variable of the serial number of GDI performance. In this step, the variable of the serial number of GDI performance is initialized to the minimum variable of the serial numbers of GDI performance so as to start to perform the GDI instructions from the GDI instruction with the minimum serial number of GDI performance.

Step 605: the network terminal to the document receiver determines whether the GDI instruction corresponding to the variable of the serial number of GDI performance is found, and performs Step 606 if yes; otherwise, performs Step 609.

Steps 606~608: the network terminal to the document receiver acquires the number of GDI function in the GDI instruction and the GDI function corresponding to the number of GDI function, performs the GDI function in the graph DC acquired through application, adds 1 to the variable of the serial number of GDI performance, and cycles back to Step 605.

The network terminal to the document receiver extracts the number of GDI function from the current GDI performance, searches out the corresponding name of GDI function in the corresponding table of the names and numbers of GDI functions, performs the GDI function to restore a portion of the contents of the sharing document; and then, the network terminal adds 1 to the serial number of GDI performance so as to find the next GDI instruction to be performed.

Step 609~610: the network terminal to the document receiver determines whether there is a GDI instruction with the serial number of GDI instruction larger than the variable of the serial number of GDI performance, and cycles back to Step 608 if yes; otherwise, closes the GDI document and terminating the procedure for restoring the GDI document.

In this step, the function of determining whether there is a GDI instruction with the serial number of GDI performance larger than the variable of the serial number of GDI performance is to determine whether there is a GDI instruction that has not been performed.

Thus, the network terminal to the document receiver, such as an IM client, a computer in the LAN or an e-mail client, completes the restoring of the GDI document sent from the document sender, and after this, the document receiver may view the contents exactly same as those of the sharing document of the document sender.

Based on the above methods of the present invention, the present invention also provides a system for transmitting a document over a Network, and besides the existing document sender and document receiver, the system further includes: a virtual printer module and a restoration module. The virtual printer module may convert a sharing document of the document sender into a GDI document, while the restoration module may perform restoration of a GDI document so as to acquire the same contents as those of the sharing document of the document sender.

Figure 7:
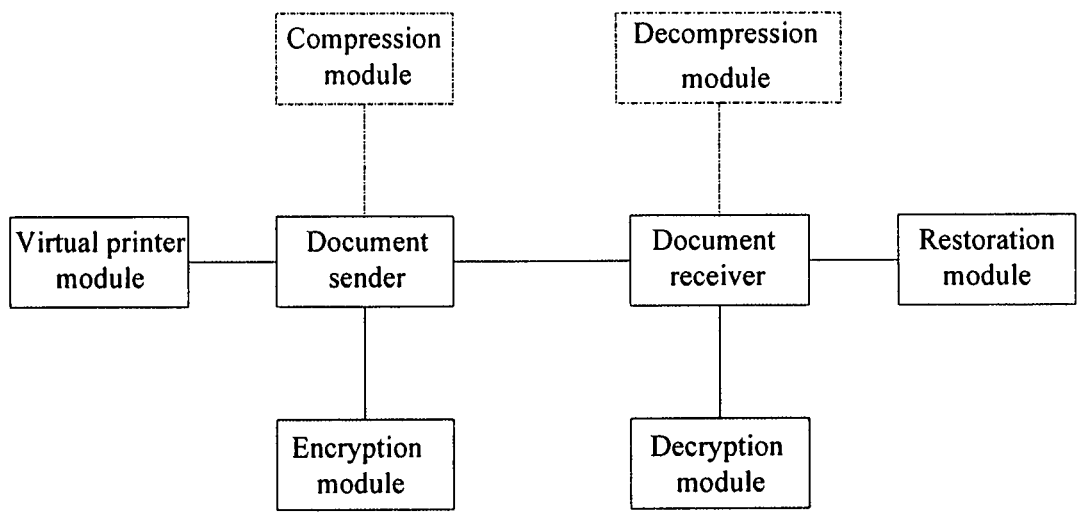
FIG. 7 is a schematic diagram illustrating the composition structure of a preferred embodiment of the system of the present invention.

FIG. 7 is a schematic diagram illustrating the composition structure of a preferred embodiment of the system of the present invention. As shown in FIG. 7, the system includes a document sender, a document receiver, a virtual printer module and a restoration module.

The document sender is used for outputting the sharing document to be sent to the virtual printer module, receiving the GDI document acquired through conversion of the sharing document from the virtual printer module and sending the GDI document to the document receiver; the virtual printer module is used for receiving a sharing document from the document sender, performing virtual printing to convert the sharing document into the GDI document, and outputting the GDI document to the document sender; the restoration module is used for receiving a GDI document from the document sender, performing a restoration operation of the GDI document to restore the same contents as those of the sharing document of the document sender from the GDI document, and outputting the contents to the document receiver; the document receiver is used for receiving a GDI document from the document sender, outputting the GDI document to the restoration module, and receiving the same contents as those of the sharing document of the document sender from the restoration module so as to provide the contents to a user of the receiver for looking over.

In order that the functions of compressing and decompressing a document are achieved to save the transportation resources of system, the system of the present invention may further include: the compression module and the decompression module shown with dash dotted lines in FIG. 7. The compression module is used for receiving a GDI document from the document sender, compressing the GDI document, and outputting the compressed GDI document to the document sender; the decompression module is used for receiving a compressed GDI document from the document receiver, decompressing the GDI document, and outputting the decompressed GDI document to the document receiver. In this case, after receiving a GDI document from the virtual printer module, the document sender needs to send the GDI document to the compression module, receive the compressed GDI document from the compression module, and send the compressed GDI document to the document receiver; meanwhile, the document receiver needs to send the received compressed GDI document to the decompression module, receive the decompressed GDI document from the decompression module, and output the decompressed GDI document to the restoration module to be dealt with.

In order that the functions of encrypting and decrypting a document are implemented to improve the transportation security of the system, the system of the present invention may further include: the encryption module and the decryption module shown with dotted lines in FIG. 7. The encryption module is used for receiving a GDI document from the document sender, encrypting the GDI document, and outputting the encrypted GDI document to the document sender; the decryption module is used for receiving an encrypted GDI document from the document receiver, decrypting the encrypted GDI document, and outputting the decrypted GDI document to the document receiver. In this case, after acquiring a GDI document from the virtual printer module, the document sender needs to send the GDI document to the encryption module, receive the encrypted GDI document from the encryption module, and send the encrypted GDI document to the document receiver; meanwhile, the document receiver needs to send the received encrypted GDI document to the decryption module, receive the decrypted GDI document from the decryption module, and output the decrypted GDI document to the restoration module to be dealt with.

Moreover, the functions of encryption/decryption and compression/decompression may be implemented in the system at the same time and in such a case, the system of the present invention needs to include the encryption module/decryption module and the compression module/decompression module at the same time. Since the order of the encryption/decryption processing and the compression/decompression processing is not limited in the present invention, the document sender may first send a GDI document sent from the virtual printer module to the encryption module to be dealt with and then send the encrypted GDI document sent from the encryption module to the compression module to be dealt with; or the document sender may first send a GDI document sent from the virtual printer module to the compression module to be dealt with and then send the compressed GDI document sent from the compression module to the encryption module to be dealt with. Accordingly, the document receiver may first send an encrypted and compressed GDI document sent from the document sender to the decompression module to be dealt with and then send the decompressed GDI document sent from the decompression module to the decryption module to be dealt with; or the document receiver may first send an encrypted and compressed GDI document sent from document sender to the decryption module to be dealt with and then send the decrypted GDI document sent from the decryption module to the decompression module to be dealt with.

In the system of the present invention, the virtual printer module, the compression module, the encryption module are all connected to the document sender and may be entities set independently or integrated into the document sender; accordingly, the restoration module, the decompression module and the decryption module are all connected to the document receiver and may be entities set independently or integrated into the document receiver.

In the embodiment of the present invention, the document sender and the document receiver may be two IM users using an IM tool, respectively, may be two computer users in the LAN, respectively, or may be two users using e-mail, respectively.

With the method for transmitting a sharing document over a Network of the embodiment of the present invention, the receiver of the document is enabled to view the contents of the sharing document successfully, which is not limited by the applications.

The foregoing description is only preferred embodiments of the present invention and is not for use in limiting the protection scope thereof. All the modifications, equivalent replacements or improvements in the scope of the present invention's sprit and principles shall be included in the protection scope of the present invention.

The invention claimed is:

1. A method for transmitting a sharing document containing only text and pictures over a network, comprising the steps of:

converting, by a virtual printer module in a first client device, GDI (Graph Device Interface) functions corresponding to a sharing document to be transmitted into GDI instructions, forming a GDI document by synthesizing the GDI instructions, and sending the GDI document to a document sender in the first client device;

receiving, by a document receiver in a second client device, the GDI document sent from the document sender through a network; and restoring, by the document receiver, the received GDI document, and contents of the restored GDI document being the same as that of the sharing document;

the method for said converting the GDI functions corresponding to the sharing document into GDI instruction, wherein forming the GDI document by synthesizing the GDI instructions comprises the steps of:

opening, by an application of the sharing document on the document sender, the interface for interacting with the virtual printer module and starting to perform virtual printing of the sharing document;

determining, by the application of the sharing document, whether the virtual printing should be terminated, if the virtual printing should be terminated, terminating the virtual printing of the sharing document by sending a GDI function indicating the end of the sharing document to the virtual printer module and terminating current procedure for generating the GDI document;

if the virtual printing should not be terminated, sending, by the application of the sharing document, based on the contents of the sharing document and by calling print driver GDI transfer interface function, a GDI function to the virtual printer module, and converting, by the virtual printer module, the received GDI function into a GDI instruction and returning the result of the conversion to the application of the sharing document; and determining, by the application of the sharing document, based on the result of the conversion returned by the virtual printer module, whether the conversion is successful, and if the conversion is successful, starting, by the application of the sharing document, to deal with the next GDI function and cycling back to the step of determining whether the virtual print should be terminated; if the conversion is unsuccessful, terminating, by the application of the sharing document, the virtual printing of the sharing document by sending a GDI function indicating the end of the sharing document to the virtual printer module and terminating the procedure for generating the GDI document;

the GDI instruction comprises at least: the name of GDI function, number of GDI function and serial number of GDI performance;

the method for converting, by the virtual printer module, the received GDI function into the GDI instruction and retuning the result of the conversion to the application of the sharing document, comprising the steps of:

calling, by the application of sharing document, the print driver GDI transfer interface function, determining, by the virtual printer module, whether the received GDI function is a GDI function indicating start of virtual printing of the sharing document, if the received GDI function is a GDI function indicating start of virtual printing of the sharing document, acquiring, by the virtual printed module, a corresponding table of names and numbers of GDI functions from a GDI subsystem, initializing the variable of the serial number of GDI performance to 0, establishing and opening an empty GDI document, and generating an initialization variable indicating the completion situation of the initialization;

if the received GDI function is nota GDI function indicating start of virtual printing of the sharing document, determining, based on the initialization variable, whether the initialization has been completed, and if the initialization has been completed, determining whether the received GDI function is a GDI function indicating end of the virtual printing of the sharing document, if the received GDI function is a GDI function indicating end of the virtual printing of the sharing document, closing the GDI document, and returning, by the virtual printer module, the result of the conversion to the application of the sharing document;

if the received GDI function is not a GDI function indicating end of the virtual print of the sharing document, determining whether the number of GDI function corresponding to the current GDI function is found, and if the number of GDI function corresponding to the current GDI function is found, adding 1 to the variable of the serial number of GDI performance, encoding the name of GDI function, the variable of the serial number of GDI performance and the GDI function based on the format of GDI instruction stream so as to generate GDI instruction, and writing the GDI instruction into the GDI document; and if the number of GDI function corresponding to the current GDI function is not found, returning, by the virtual printer module, the result of the conversion to the application of the sharing document; and if initialization has not been completed, cycling back to the step of acquiring, by the virtual printer module, a corresponding table of names and numbers of GDI functions from a GDI subsystem, initializing the variable of the serial number of GDI performance to 0, establishing and opening an empty GDI document, and generating an initialization variable indicating the completion situation of the initialization.

2. The method of claim 1, further comprising the steps of:
compressing, by the document sender, the GDI document; and
decompressing, by the document receiver, the received GDI document.

3. The method of claim 1, further comprising the steps of:
encrypting, by the document sender, the GDI document; and
decrypting, by the document receiver, the received GDI document.

4. The method of claim 1, wherein the method for receiving, by the document receiver, the GDI document sent from the document sender, through a network comprises at least the steps of:
receiving, by the document receiver, the GDI document sent from the document sender with an Instant Messaging tool; or,
receiving, by the document receiver, the GDI document sent from the document sender through an e-mail; or,
receiving, by the document receiver, the GDI document sent from the document sender by logging on the network terminal to the document sender.

5. A system for transmitting a sharing document containing only text and pictures over a network, comprising:
a first network computer including a processor coupled to a memory storing instructions for execution by the processor, to convert GDI (Graph Device Interface) functions corresponding to a sharing document to be transmitted into GDI instructions, form a GDI document by synthesizing the GDI instructions, and send the GDI document to the second network computer over the network;
a second network computer including a processor coupled to a memory storing instructions for execution by the processor, to receive the GDI document from the first network computer, restore the GDI document, and contents of the restored GDI document being same as that of the sharing document;
the first network computer comprises a document sender and a virtual printing module, and
an application sharing document on the document sender is to:
open the interface for interacting with the virtual printer module and start to perform virtual printing of the sharing document;
determine whether the virtual printing should be terminated, if the virtual printing should be terminated, terminate the virtual printing of the sharing document by sending a GDI function indicating the end of the sharing document to the virtual printer module and terminate current procedure for generating the GDI document;
if the virtual printing should not be terminated, send, based on the contents of the sharing document and b calling print driver GDI transfer interface function, a GDI function to the virtual printer module;
receive a result of converting the received GDI function into a GDI instruction from the virtual printer module;
determine, based on the result received from the virtual printer module, whether the conversion is successful, and if the conversion is successful, start to deal with the next GDI function and cycle back to the step of determining whether the virtual print should be terminated; if the conversion is unsuccessful, terminate the virtual printing of the sharing document by sending a GDI function indicating the end of the sharing document to the virtual printer module and terminate the procedure for generating the GDI document; and the virtual printer module is to convert the received GDI function into a GDI instruction and return the result of the conversion to the application of the sharing document; and the GDI instruction comprises at least: the name of GDI function, number of GDI function and serial number of GDI performance;

the virtual module is to:

after the application of sharing document calls the print driver GDI transfer interface function, determine, whether the received GDI function is a GDI function indicating start of virtual printing of the sharing document, if the received GDI function is a GDI function indicating start of virtual printing of the sharing document, acquire a corresponding table of names and numbers of GDI functions from a GDI subsystem, initialize the variable of the serial number of GDI performance to 0, establish and open an empty GDI document, and generate an initialization variable indicating the completion situation of the initialization;

if the received GDI function is not a GDI function indicating start of virtual printing of the sharing document, determine, based on the initialization variable, whether the initialization has been completed, and if the initialization has been completed, determine whether the received GDI function is a GDI function indicating end of the virtual printing of the sharing document, if the received GDI function is a GDI function indicating end of the virtual printing of the sharing document, close the GDI document, and return the result of the conversion to the application of the sharing document;

if the received GDI function is not a GDI function indicating end of the virtual print of the sharing document, determine whether the number of GDI function corresponding to the current GDI function is found, and if the number of GDI function corresponding to the current GDI function is found, add 1 to the variable of the serial number of GDI performance, encode the name of GDI function, the variable of the serial number of GDI performance and the GDI function based on the format of GDI instruction stream so as to venerate a GDI instruction, and write the GDI instruction into the GDI document; and if the number of GDS function correspond to the current GDI function is not found, return the result of the conversion to the application of the sharing document; and if initialization has not been completed, cycle back to the step of acquiring the corresponding table of names and numbers of GDI functions from the GDI subsystem, initializing the variable of the serial number of GDI performance to 0, establishing and opening the empty GDI document, and generating the initialization variable indicating the completion situation of the initialization.

6. The system of claim 5, wherein
the first network computer is further to compress the GDI document, and outputting the compressed GDI document to the second network computer;

the second network computer is further to receive the compressed GDI document sent from the first network computer and decompress the GDI document.

7. The system of claim 5, wherein
the first network computer is further to encrypt the GDI document and send the encrypted GDI document to the second network computer;

the second network computer is further to receive the encrypted GDI document sent from the first network computer and decrypt the encrypted GDI document.

8. A network computer for transmitting a sharing document containing only text and pictures to another network computer over a network, including a processor coupled to a memory storing instructions for execution by the processor, and comprising a document sender and a virtual printer module; the virtual printer module being stored on a memory;

the document sender is to output a sharing document containing only text and pictures to be sent to the virtual printer module, receive a GDI document into which the sharing document is converted from the virtual printer module and send the GDI document to the another network computer over the network; and the virtual printer module is to receive the sharing document from the document sender, convert GDI functions corresponding to the sharing document into GDI instructions, form a GDI document by synthesizing the GDI instructions, and output the GDI document to the document sender;

an application of the sharing document on the document sender is to open the interface for interacting with the virtual printer module and start to perform virtual printing of the sharing document;

determine whether the virtual printing should be terminated, if the virtual printing should be terminated, terminate to virtual printing of the sharing document by sending a GDI function indicating the end of the sharing document to the virtual printer module and terminate current procedure for generating the GDI document;

if the virtual printing should not be terminated, send, based on the contents of the sharing document and by calling print driver GDI transfer interface function, a GDI function to the virtual printer module;

receive a result of converting the received GDI function into a GDI instruction from the virtual printer module;

determine, based on the result received from the virtual printer module, whether the conversion is successful, and if the conversion is successful, start to deal with the next GDI function and cycle back to the step of determining whether the virtual print should be terminated; if the conversion is unsuccessful, terminate the virtual printing of the sharing document by sending a GDI function indicating the end of the sharing document to the virtual printer module and terminate the procedure for generating the GDI document; and the virtual printer module is to convert the received GDI function into a GDI instruction and return the result of the conversion to the application of the sharing document; and the GDI instruction comprises at least: the name of GDI function, number of GDI function and serial number of GDI performance;

the virtual printer module is to:
  after the application of sharing document calls the print driver GDI transfer interface function, determine, whether the received GDI function is a GDI function indicating start of virtual printing of the sharing document, if the received GDI function is a GDI function indicating start of virtual printing of the sharing document, acquire a corresponding table of names and numbers of GDI functions from a GDI subsystem, initialize the variable of the serial number of GDI performance to 0, establish and open an empty GDI document, and generate an initialization variable indicating the completion situation of the initialization;
  if the received GDI function is not a GDI function indicating start of virtual printing of the sharing document, determine, based on the initialization variable, whether the initialization has been completed, and if the initialization has been completed, determine whether the received GDI function is a GDI function indicating end of the virtual printing of the sharing document, if the received GDI function is a GDI function indicating end of the virtual printing of the sharing document, close the GDI document, and return the result of the conversion to the application of the sharing document;
  if the received GDI function is not a GDI function indicating end of the virtual print of the sharing document, determine whether the number of GDI function corresponding to the current GDI function is found, and if the number of GDI function corresponding to the current GDI function is found, add 1 to the variable of the serial number of GDI performance, encode the name of GDI function, the variable of the serial number of GDI performance and the GDI function based on the format of GDI instruction stream so as to generate a GDI instruction, and write the GDI instruction into the GDI document; and
  if the number of GDI function corresponding to the current GDI function is not found, return the result of the conversion to the application of the sharing document; and
  if initialization has not been completed, cycle back to the step of acquiring the corresponding table of names and numbers of GDI functions from the GDI subsystem, initializing the variable of the serial number of GDI performance to 0, establishing and opening the empty GDI document, and generating the initialization variable indicating the completion situation of the initialization.

9. The network computer of claim 8, further comprising:
a compression module stored on the memory;
the compression module is to receive a GDI document from the document sender, compress the GDI document, and output the compressed GDI document to the document sender; and
the document sender is further to output a GDI document sent from the virtual printer module to the compression module and send the compressed GDI document sent from the compression module to a document receiver.

10. The network computer of claim 9, further comprising:
an encryption module stored on the memory;
the encryption module is to receive a GDI document from a document sender, encrypt the GDI document, and output the encrypted GDI document to the document sender; and
the document sender is further to output a GDI document sent from the virtual printer module to the encryption module and send the encrypted GDI document sent from the encryption module to a document receiver.

11. The network computer of claim 10, wherein the compression module is an entity set independently or integrated into the document sender, the encryption module is an entity set independently or integrated into the document sender, and the virtual printer module is an entity set independently or integrated into the document sender.

12. A method for sending a sharing document containing only text and pictures over a network, comprising the steps of:
  converting, by a virtual printer module in a first client device, GDI (Graph Device Interface) functions corresponding to a sharing document to be transmitted into GDI instructions, forming a GDI document by synthesizing the GDI instructions, and sending the GDI document to a document sender in the first client device; and
  sending, by the document sender, the GDI document to a document receiver in a second client device through a network:
    the method for said converting the GDI functions corresponding to the sharing document into GDI instruction, forming the GDI document by synthesizing the GDI instructions comprises the steps of:
      opening, by an application of the sharing document on the document sender, the interface for interacting with the virtual printer module and starting to perform virtual printing of the sharing document;
      determining, by the application of sharing document, whether the virtual printing should be terminated, if the virtual printing should be terminated, terminating the virtual printing of the sharing document by sending a GDI function indicating the end of the sharing document to the virtual printer module and terminating current procedure for generating the GDI document;
      if the virtual printing should not be terminated, sending, by the application of the sharing document, based on the contents of the sharing document and by calling print driver GDI transfer interface function, a GDI function to the virtual printer module, and converting, by the virtual printer module, the received GDI function into a GDI instruction and returning the result of the conversion to the application of the sharing document; and
      determining, by the application of the sharing document, based on the result of the conversion returned by the virtual printer module, whether the conversion is successful, and if the conversion is successful, starting, by the application of the sharing document, to deal with the next GDI function and cycling back to the step of determining whether the virtual print should be terminated; if the conversion is unsuccessful, terminating, by the application of the sharing document, the virtual printing of the sharing document by sending a GDI function indicating the end of the sharing document to the virtual printer module and terrninating the procedure for generating the GDI document,
    the GDI instruction comprises at least: the name of GDI function, number of GDI function and serial number of GDI performance:
    the method for converting, by the virtual printer module, the received GDI function into the GDI instruction and returning the result of the conversion to the application of the sharing document, comprising the steps of:
  calling, by the application of sharing document, the print driver GDI transfer interface function, determining, by the virtual printer module, whether the received GDI function is a GDI function indicating start of virtual printing of the sharing document, if the received a GDI function is a GDI function indicating start of virtual printing the sharing document, acquiring, by the virtual printer module, a corresponding table of names and numbers of GDI functions from a GDI subsystem, initializing the variable of the serial number of GDI performance to 0, establishing and opening an empty GDI document, and generating an initialization variable indicating the completion situation of the initialization;
  if the received GDI function is not a GDI function indicating start of virtual printing of the sharing document, determining, based on the initialization variable, whether the initialization has been completed, and if the initialization has been completed, determining whether the received GDI function is a GDI function indicating end of the virtual printing of the sharing document, if the received GDI function is a GDI function indicating end of the virtual printing of the sharing document, closing the GDI document, and returning, by the virtual printer module, the result of the conversion to the application of the sharing document;
  if the received GDI function is not a GDI function indicating end of the virtual print of the sharing document, determining whether the number of GDI function corresponding to the current GDI function is found, and if the number of GDI function corresponding to the current GDI function is found, adding 1 to the variable of the serial number of GDI performance, encoding the name of GDI function, the variable of the serial number of GDI performance and the GDI function based on the format of GDI instruction stream so as to generate a GDI instruction, and writing the GDI instruction into the GDI document; and
  if the number of GDI function corresponding to the current GDI function is not found, returning, by the virtual printer module, the results of the conversion to the application of the sharing document; and
  if initialization has not been completed, cycling back to the step of acquiring, by the virtual printer module, a corresponding table of names and numbers of GDI functions from a GDI subsystem, initializing the variable of the serial number of GDI performance to 0, establishing and opening an empty GDI document, and generating an initialization variable indicating the completion situation of the initialization.

13. The method of claim 12, further comprising compressing, by the document sender, the GDI document.

14. The method of claim 12, further comprising encrypting, by the document sender, the GDI document.

15. The method of claim 12, wherein the method for said determining whether the virtual printing should be terminated comprises the steps of determining, by the application of the sharing document, whether the GDI functions called based on the contents of the sharing document have all been sent to the virtual printer module, and if the GDI functions called based on the contents of the sharing document have all been sent to the virtual printer module, determining that the virtual printing should be terminated, and if the GDI functions called based on the contents of the sharing document have not all been sent to the virtual printer module, determining that the virtual printing should not be terminated.

16. The method of claim 12, wherein the GDI instruction comprises at least the total length of current GDI interface instruction, number of parameters, parameter value of each of parameters and length of parameter value.

17. The method of claim 12, the method for sending, by the document sender, the GDI document to a document receiver through a network comprising the steps of:
  sending, by the document sender, the GDI document to a document receiver with an Instant Messaging tool; or,
  sending, by the document sender, the GDI document to a document receiver through an e-mail; or,
  sending, by the document sender, the GDI document to a document receiver by logging on the network terminal to the document receiver.

18. A method for receiving a sharing document containing only text and pictures of format over a network, comprising the steps of:
  receiving, by a document receiver in a second client device, a GDI (Graph Device Interface) document sent from a document sender in a first client device through a network, the GDI document being formed by synthesizing GDI instructions into which GDI functions corresponding to a sharing document to be transmitted is converted by a virtual printer module in the first client device; and
  restoring, by the document receiver, the received GDI document, contents of the restored GDI document being same as that of the sharing document;
  the method for converting the GDI functions corresponding to the sharing document into GDI instructions, forming the GDI document by synthesizing the GDI instructions comprises the steps of:
    opening, by an application of the sharing document on the document sender, the interface, for interacting with the virtual printer module and starting to perform virtual printing of the sharing document;
    determining, by the application of the sharing document, whether the virtual printing should be terminated, if the virtual printing should be terminated, terminating the virtual printing of the sharing document by sending a GDI function indicating the end of the sharing document to the virtual printer module and terminating current procedure for generating the GDI document;
    if the virtual printing should not to be terminated, sending, by the application of the sharing document, based on the contents of the sharing document and by calling print driver GDI transfer interface function, a GDI function to the virtual printer module, and converting, by the virtual printer module, the received GDI function into a GDI instruction and returning the result of the conversion to the application of the sharing document; and
    determining, by the application of the sharing document, based on the result of the conversion returned by the virtual printer module, whether the conversion is successful, and if the conversion is successful, starting, by the application of the sharing document, to deal with the next GDI function and cycling back to the step of determining whether the virtual print should be terminated; if the conversion is unsuccessful, terminating, by the application of the sharing document, the virtual printing of the sharing document by sending a GDI function indicating the end of the sharing document to the virtual printer module and terminating the procedure for generating the GDI document;

the GDI instruction comprises at least: the name of GDI function, number of GDI function and serial number of GDI performance;

the method for converting, by the virtual printer module, the received GDI function into the GDI instruction and returning the result of the conversion to the application of the sharing document, comprising the steps of:

calling, by the application of sharing document, the print driver GDI transfer interface function, determining, by the virtual printer, module whether the received GDI function is a GDI function indicating start of virtual printing of the sharing document, if the received GDI function is a GDI function indicating start of virtual printing of the sharing document, acquiring, by the virtual printer module, a corresponding table of names and numbers of GDI functions from a GDI subsystem, initializing the variable of the serial number of GDI performance to 0, establishing and opening an empty GDI document, and generating an initialization variable indicating the completion situation of the initialization;

if the received GDI function is nota GDI function indicating start of virtual printing of the sharing document, determining, based on the initialization variable, whether the initialization has been completed and if the initialization has been completed, determining whether the received GDI function is a GDI function indicating end of the virtual printing of the sharing document, if the received GDI function is a GDI function indicating end of the virtual printing of the sharing document, closing the GDI document, and returning, by the virtual printer module, the result of the conversion to the application of the sharing document;

if the received GDI function is not a GDI function indicating end of the virtual print of the sharing document, determining whether the number of GDI function corresponding to the current GDI function is found, and if the number of GDI function corresponding to the current GDI function is found, adding 1 to the variable of the serial number of GDI performance, encoding the name of GDI function, the variable of the serial number of GDI performance and the GDI function based on the format of GDI instruction stream so as to generate GDI instruction, and writing the GDI instruction into the GDI document; and if the number of GDI function corresponding to the current GDI function is not found, returning, by the virtual printer module, the result of the conversion to the application of the sharing document; and if initialization has not been completed, cycling back to the step of acquiring, by the virtual printer module, a corresponding table of names and numbers of GDI functions from a GDI subsystem, initializing the variable of the serial number of GDI performance to 0, establishing and empty GDI document, and generating an initialization variable indicating the completion situation of the initialization.

19. The method of claim 18, further comprising:
decompressing, by the document receiver, the received GDI document.

20. The method of claim 18, further comprising:
decrypting, by the document receiver, the received GDI document 21. The method of claim 18, the GDI document comprises at least a GDI instruction;
wherein restoring the received GDI document comprises the steps of performing a graph device function corresponding to the GDI instruction in the GDI document.

22. The method of claim 21, the method for restoring the received GDI document comprising the steps of:

applying, by the network terminal to the document receiver, to its graph device subsystem for a Graph Device Context, reading all the GDI instructions in the received GDI document, sorting all the GDI instructions ascending based on the serial numbers of GDI performance in the GDI instructions, and initializing the variable of the serial number of GDI performance to the minimum of the serial numbers of GDI performance;

determining whether the GDI instruction corresponding to the variable of the serial number of GDI performance is found, if the GDI instruction is found, acquiring the number of the GDI function in the current GDI instruction and the GDI function corresponding to the number of the GDI function, performing the GDI function in the Graph Device Context acquired through the application, adding 1 to the variable of the serial number of GDI performance, and cycling back to the step of determining whether the GDI instruction corresponding to the variable of the serial number of GDI performance is found; and if the GDI instruction is not found, determining whether there is a GDI instruction with the serial number of the GDI performance larger than the variable of the serial number of GDI performance, and if there is a GDI instruction with the serial number of the GDI performance larger than the variable of the serial number of GDI performance, adding 1 to the variable of the serial number of GDI performance and cycling back to the step of determining whether the GDI instruction corresponding to the variable of the serial number of GDI performance is found; if there is no GDI instruction with the serial number of the GDI performance larger than the variable of the serial number of GDI performance, closing the GDI document and terminating the procedure for restoring the GDI document.

23. The method of claim 18, the method for receiving, by the document receiver, a GDI document sent from a document sender through a network comprising the steps of:

receiving, by the document receiver, the GDI document sent from a document sender with an Instant Messaging tool; or, receiving, by the document receiver, the GDI document sent from a document sender through an e-mail; or, receiving, by the document receiver, the GDI document sent from a document sender by logging on the network terminal to the document sender.

\* \* \* \* \*